United States Patent [19]

Mitch

[11] Patent Number: 4,789,217
[45] Date of Patent: Dec. 6, 1988

[54] METHOD OF AND APPARATUS FOR SECURING ELONGATE MEMBERS OF GENERALLY CYLINDRICAL FORM IN END-TO-END RELATIONSHIP

[75] Inventor: John H. Mitch, Portland, Oreg.

[73] Assignee: Tektronix, Inc., Beaverton, Oreg.

[21] Appl. No.: 46,073

[22] Filed: May 5, 1987

[51] Int. Cl.⁴ .................. G02B 6/36; G02B 6/38
[52] U.S. Cl. .................. 350/96.21; 350/96.20
[58] Field of Search .......... 350/96.20, 96.21; 156/158, 213

[56] References Cited

U.S. PATENT DOCUMENTS

| | | | |
|---|---|---|---|
| 3,768,146 | 10/1973 | Braum et al. | 350/96.21 X |
| 4,102,561 | 7/1978 | Hawk et al. | 350/96.21 |
| 4,147,404 | 4/1979 | Hensel | 350/96.21 |
| 4,227,951 | 10/1980 | Mignien | 350/96.21 X |
| 4,583,819 | 4/1986 | Duesbury | 350/96.20 X |
| 4,594,121 | 6/1986 | Mitch | 350/96.21 X |
| 4,629,284 | 12/1986 | Malavieille | 350/96.21 |

*Primary Examiner*—William L. Sikes
*Assistant Examiner*—Akm E. Ullah
*Attorney, Agent, or Firm*—John Smith-Hill; Robert S. Hulse

[57] ABSTRACT

A method and apparatus for securing enlongatge members of generally cylindrical form in end-to-end relationship, particularly for forming an optic fiber splice. Optic fibers are spliced by pressing a form, preferably an optic fiber of the same diameter as those to be spliced, into a deformable body to create a groove for receiving the ends of the optic fibers in close alignment. To secure the optic fibers, an index matching adhesive is cured by UV irradiation through a glass cover plate bonded to the deformable body.

16 Claims, 2 Drawing Sheets

METHOD OF AND APPARATUS FOR SECURING ELONGATE MEMBERS OF GENERALLY CYLINDRICAL FORM IN END-TO-END RELATIONSHIP

This invention relates to a method of and apparatus for securing generally cyclindrical elongate members, particularly end portions of optical fibers, in end-to-end relationship.

BACKGROUND OF THE INVENTION

An optical fiber comprises a core of high index material surrounded by a cladding of low index material. The diameter of the core ranges from about 4-9 μm for single mode transmission to about 50-100 μm for multi mode transmission. The radial thickness of the cladding is generally about 125 or 140 μm, regardless of the diameter of the core. The fiber is provided with a plastic buffer coating to protect it from damage.

Although optical fibers can, using known technology, be manufactured so as to have essentially uniform properties over essentially indefinite lengths, it is conventional for such fibers to be sold in lengths of, e.g., 1 km, and for two or more lengths of fiber to be spliced together, i.e., joined together end-to-end, in order to produce a fiber longer than 1 km. Moreover, even though a fiber of 1 km or more can readily be manufactured so that it is without significant defects, handling of the fiber during installation as part of a fiber optic link may result in damage to the fiber, rendering it necessary to remove the damaged portion of the fiber and splice the undamaged portions together. Accordingly, techniques for splicing optical fibers have been developed. Several techniques that are currently in use in installation of fiber optic links involve use of special splice units for receiving the ends of the fibers to be spliced and holding those ends in accurately determined alignment. It will be understood that any error in alignment of the ends of the fibers results in potential loss in transmission of optical energy through the splice. The splice units are, therefore, manufactured to high accuracy and they typically include several components. Consequently, such units are expensive. Splice units themselves remain permanently installed on the spliced fiber, and therefore cannot be used in making multiple splices. Several types of splices for optical fibers are described in *Fiber Optics Technology and Applications* by S. D. Personick, published by Plenum Press.

An inexpensive technique for splicing optical fibers is described in U.S. Pat. No. 4,594,121, issued June 10, 1986 (Mitch).

SUMMARY OF THE INVENTION

A preferred embodiment of the invention is a method of securing generally cylindrical elongate members in end-to-end relationship. The method may be applied to splicing end portions of optic fibers. A cylindrical member, having a diameter equal to that of the members to be secured, is pressed into a body of deformable material to form a groove for receiving the members to be secured. Because the groove is of equal diameter to the members to be secured, the end portions thereof are aligned closely when placed in the channel. The members to be secured are held in the groove by adhesive material and a cover plate.

BRIEF DESCRIPTION OF THE DRAWINGS

For a better understanding of the invention, and to show how the same can be carried into effect, reference will now be made, by way of example, to the accompanying drawings, in which.

DETAILED DESCRIPTION

Figure 1:
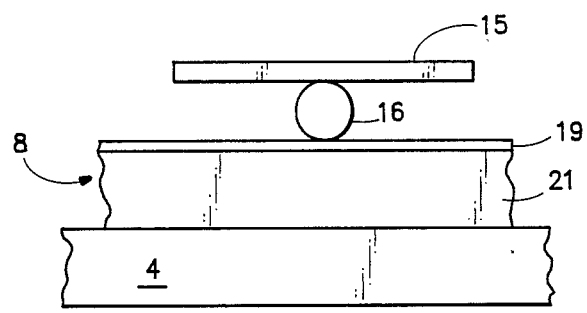
FIGS. 1, 2, 3 and 4 are similar views of a component used in splicing two optical fibers together, at successive times during the process of fabricating the splice.
Figure 2:
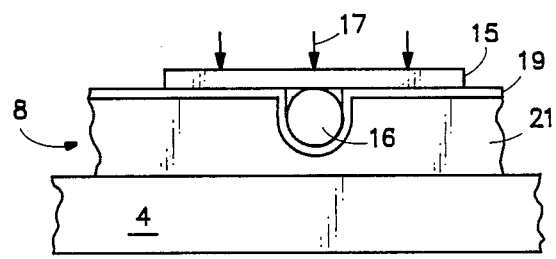
Figure 3:
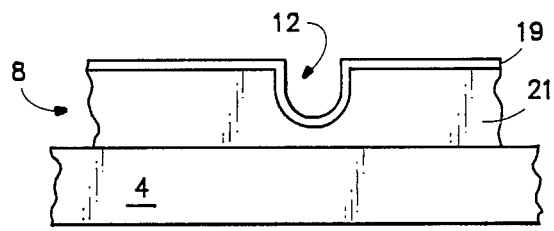

The splice unit illustrated in FIGS. 1-6 comprises a substrate 4 of essentially rigid material, such as glass, quartz, and certain plastics and metals, and a plastically deformable body 8. The body 8 is secured to the substrate 4, and is formed with a groove 12 in its upper surface. The manner in which the groove 12 is formed is illustrated in FIGS. 1, 2, 3 and 4. As shown in FIG. 1, an optic fiber 16 is positioned on top of the body 8 so that it extends along the path to be followed by the fibers that are to be joined by the splice unit. A pressure plate 15 is placed above the optic fiber 16 and pressure is applied thereto, as indicated by arrows 17 in FIG. 2, forcing optic fiber 16 into body 8. When the fiber 16 has been forced into the body 8 to such an extent that the maximum depth of the groove 12 is at least as great as the diameter of the fiber 16, the fiber 16 is removed from the groove, see FIG. 3. The pressure used in forming the groove must be controlled so that the groove is sufficiently deep to receive the fiber yet the portions of the body 8 adjacent the groove are not significantly deformed. Groove 12 is thereby dimensioned to receive optic fibers 24 and 28 (FIG. 6) for splicing, each optic fiber having a diameter equal to that of fiber 16.

Figure 4:
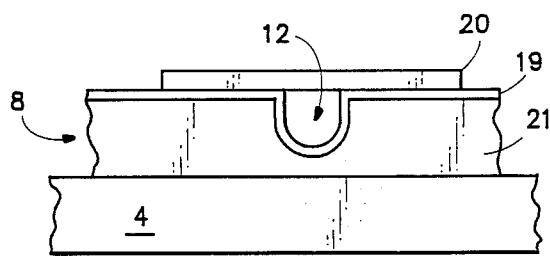
Figure 5:
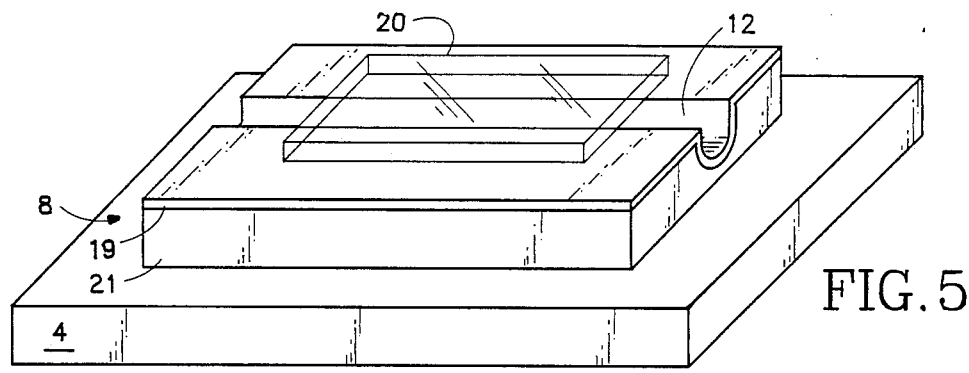
FIG. 5 is a perspective view of a splice unit including the component illustrated in FIGS. 1-4.

In FIG. 4, a glass cover plate 20 is secured to body 8 so that it extends over groove 12 but leaves the two opposite ends of groove 12 exposed. The splice unit, as illustrated in FIG. 5, is now ready to receive optic fibers 24 and 28.

Figure 6:
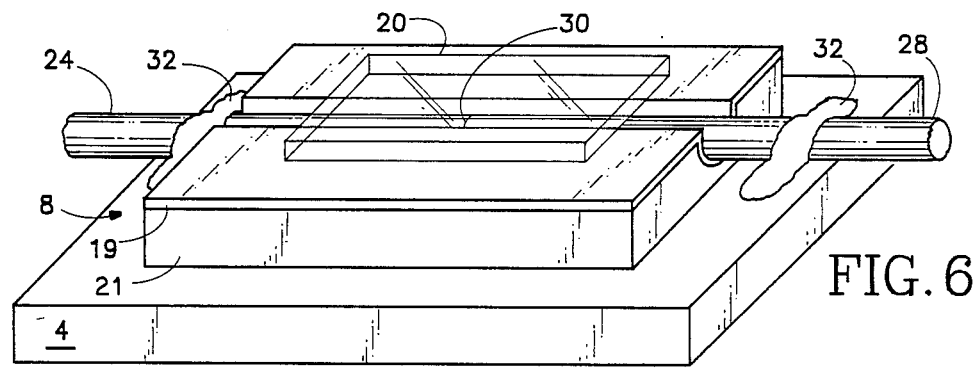
FIG. 6 is a view similar to FIG. 5 with the splice completed.

Turning to FIG. 6, a small quantity of a UV curable index matching fluid is introduced into the groove 12 beneath the cover plate 20, and the optic fibers 24 and 28 are inserted into the groove by way of exposed ends respectively. The quality of the optical coupling between the fibers 24 and 28 is observed by local injection detection (LID) or by introducing light into one of the fibers by way of the end remote from the splice unit and observing the light emitted from that end of the other fiber which is remote from the splice unit, and when the desired degree of coupling is achieved the adhesive is cured by irradiation through the cover plate with ultraviolet light to form a butt joint 30. To relieve strain on butt joint 30, a bonding agent 32 is used to affix fibers 24 and 28 to substrate 4.

Before fitting fibers 24 and 28 in the groove 12, fibers 24 and 28 are cleaved in order to provide them with flat end faces which are perpendicular to the central axes of the fibers respectively. The cleaving tends to result in the fiber ends having very sharp edges. If deformable body 8 is a unitary body of soft material, the sharp edges may be capable of cutting into the soft material and forming a shaving as the fibers are advanced towards each other in groove 12. This shaving can prevent the ends of the fiber from being brought into close, optically-coupled relationship. To overcome this problem, body 8 comprises a soft foil 21, such as lead, and a protective layer 19 of relatively harder ductile material laminated upon the upper surface of foil 21. The protective layer 19 must be capable of conforming to the shape of fiber 16 as fiber 16 is forced into body 8 yet hard enough to resist shaving by the cleaved fiber sections. Suitable materials for protective layer 19 include some metals, and organic material such as mylar, a polyimide such as is sold under the trademark Kapton, or a PTFE such as that sold under the trademark Teflon.

Figure 7:
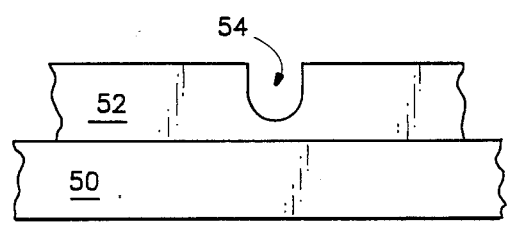
FIG. 7 is a view of a second splice unit.
Figure 8:
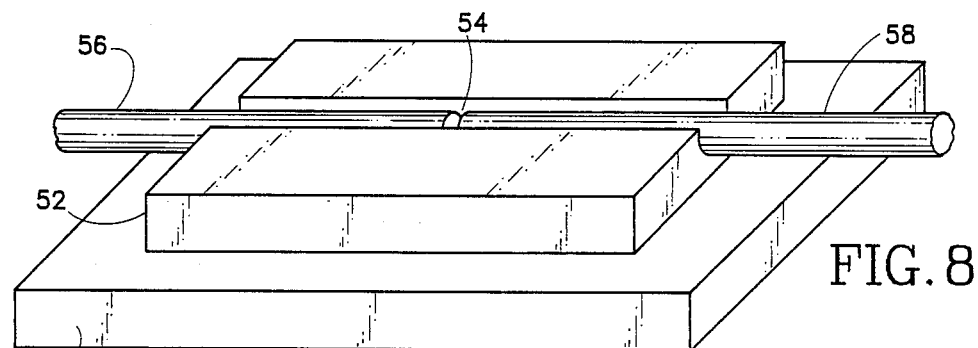
FIGS. 8 and 9 are perspective views of the splice unit of FIG. 7 at successive times during splicing.
Figure 9:
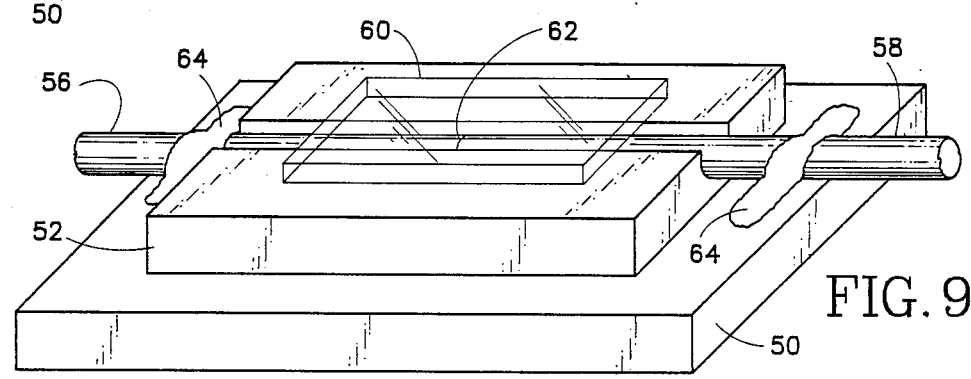

A second splice unit, illustrated in FIGS. 7-9, comprises a substrate 50 and a plastically deformable body 52. A groove 54 is formed in foil 52 in the same manner as groove 12 (FIGS. 1-6) is formed in body 8 and FIG. 7 shows the splice unit just after groove 54 has been so formed. In FIG. 8, optic fibers 56 and 58 are placed in groove 54 in end-to-end and slightly spaced relation. A UV curable index matching fluid is then introduced into the groove 54 and wicks into space separating optic fibers 56 and 58. A glass cover plate 60 is bonded to body 52. Optic fibers 56 and 58 are then advanced towards each other, and after the desired quality of optical coupling is achieved, the adhesive is cured by irradiation through the glass cover plate 60 with ultraviolet light to form a butt joint 62. FIG. 9 shows the completed splice unit including a bonding agent 64 affixing fibers 56 and 58 to substrate 50 in order to relieve strain on butt joint 62. In this embodiment a protective ductile layer is not necessary in that optic fibers 56 and 58 are advanced only a short distance along the length of groove 54 and therefore the risk of their cutting into the soft material of body 52 is small.

In the completed assembly of both splice units, the index matching material serves not only to displace air from between the confronting end faces of the fiber an thereby reduce discontinuities in refractive index but also to secure the fibers to the deformable body and the cover plate. Also, use of an optic fiber to form the groove insures that the size of the groove formed in the body will conform closely to the size required for accommodating ends of the fibers to be joined. This serves to minimize need for clearance to accommodate variations in the size of the fiber and therefore insures that the fibers can be accurately aligned.

It will be appreciated that the present invention is not restricted to the particular methods and devices that have been described with reference to the drawings, and that variations may be made therein without departing from the scope of the invention as defined in the appended claims and equivalents thereof. For example, the invention is not limited to the use of an optical fiber to form the groove in the body, and a wire of suitable size may be used instead. Multiple grooves may be formed in a single deformable body in order to allow splicing of multiple fibers. Nor is the present invention restricted to use of lead as the deformable material. Other suitable materials include clays, putties, and settable organic materials.

I claim:

1. A method of placing an end portion of a generally cylindrical elongate member in a predetermined position, said method comprising the steps of:
   providing a plastically deformable body, which comprises a layer of plastically deformable material and a layer of ductile material, relatively harder than the plastically deformable material,
   disposing a form, which corresponds in its external cross-sectional shape to the end portion of the elongate member, in contact with the layer of ductile material,
   applying pressure to the form so as to create a groove in the deformable body,
   removing the form from the groove, and
   placing the end portion of the elongate member in the groove.

2. A method according to claim 1, wherein the deformable body has a generally flat surface from which the groove extends into the body, and the method also comprises securing a cover plate to the body of deformable material over the groove.

3. A method according to claim 1, wherein the first mentioned generally cylindrical member is circular in cross-section and a second generally cylindrical member which is circular in cross-section and is substantially equal in diameter to the first-mentioned member is placed in end-to-end alignment with the end portion of the first-mentioned member by placing an end portion of the second member into the groove.

4. A method according to claim 1, wherein said elongate member is an optic fiber.

5. A method of splicing end portions of optic fibers, said method comprising the following steps, not necessarily in the order stated:
   providing a plastically deformable body which comprises a layer of plastically deformable material and a layer of ductile material relatively harder than the plastically deformable material, said layer of ductile material having a generally flat surface;
   placing a form upon said layer of ductile material, said form corresponding in its external cross-section to the end portions of said optic fibers;
   pressing said form into said body so as to create a groove in said body of deformable material;
   placing said end portions of said optic fibers in said groove in end-to-end relationship;
   bonding a cover plate to said body of deformable material so that it covers said groove; and
   bonding said end portions of said optic fibers together.

6. A method according to claim 5, wherein said cover plate is bonded to said body before said end portions of said optic fibers are placed in said groove.

7. A method according to claim 5, wherein said ductile material is selected from the group consisting of metal and organic materials.

8. A method according to claim 7, wherein said organic material is selected from the group consisting of mylar, a polyimide and PTFE.

9. A method according to claim 5, wherein said end portions of said optic fibers are placed in said groove before said cover plate is bonded to said body.

10. A method according to claim 5, wherein said body comprises a layer of lead.

11. A method according to claim 5, wherein said form is a wire.

12. A method according to claim 5, wherein said form is an optic fiber.

13. An optic fiber splice comprising:
   a plastically deformable body which comprises a layer of plastically deformable material and a layer of ductile material relatively harder than the plastically deformable material and is formed with a groove in a surface thereof, said groove being bounded at its interior by said layer of ductile material;

optic fibers each having an end portion received in said groove, said end portions being in end-to-end relationship; and means which bond said end portions together.

14. A splice according to claim 13, further comprising a cover plate bonded to said deformable body.

15. A splice according to claim 13, wherein said deformable material is lead.

16. A splice according to claim 13, wherein said ductile material is selected from the group consisting of metal, mylar, a polyimide and PTFE.

* * * * *